No. 740,994. Patented October 6, 1903.

UNITED STATES PATENT OFFICE.

BENJAMIN F. SCHWIER, OF CLEVELAND, OHIO, ASSIGNOR OF ONE-HALF TO HERBERT J. NORRIS, OF WELLINGTON, OHIO.

COMPOSITION OF MATTER.

SPECIFICATION forming part of Letters Patent No. 740,994, dated October 6, 1903.

Application filed May 16, 1902. Serial No. 107,661. (Specimens.)

*To all whom it may concern:*

Be it known that I, BENJAMIN F. SCHWIER, a citizen of the United States, residing at Cleveland, in the county of Cuyahoga and State of Ohio, have invented a new and useful Composition of Matter to be Used in the Manufacture of Bodies for Grinding, Forming, and Polishing, of which the following is a specification.

My composition consists of the following ingredients combined in proportions stated, viz: shale, fifty per cent.; grit-sand, thirty per cent.; fire-clay, ten per cent.; jollie-clay, ten per cent. These ingredients are to be thoroughly mingled together, so as to produce a plastic body or mass.

After the above-mentioned ingredients have been mingled together each separate and distinct grinding-body is molded or brought into the desired form and subjected to heavy pressure. For instance, if a rotary grinding-disk is desired a wheel or disk is molded of the desired size, reference being had to the particular kind of work designed to be done, or, in other words, the material designed to be operated upon by the grinding-disk. I do not desire, however, to be confined to the disk or wheel, as it will be understood that the object and purpose can be carried out without any particular reference to the shape or size of the finished grinding-body. After the plastic mass has been molded or brought into the desired form it is burned in a kiln until vitrification takes place.

It will be understood that the proportions of the ingredients may be changed or varied without departing from the nature of the present invention; but to successfully carry out the purpose all of the above-mentioned ingredients are necessary and important, but various degrees of fineness may be produced by a modification or variance of their proportions.

Having fully described my invention, what I claim as new, and desire to secure by Letters Patent, is—

The herein-described composition of matter consisting of shale, grit-sand, fire-clay and jollie-clay in about the proportions described, substantially as and for the purpose specified.

In testimony that I claim the above I have hereunto subscribed my name in the presence of two witnesses.

BENJAMIN F. SCHWIER.

Witnesses:
SAMUEL BURGERT,
A. H. PARRATT.